United States Patent Office 3,705,868
Patented Dec. 12, 1972

3,705,868
ADHESIVE FOR ADHERING A POLYESTER FIBROUS MATERIAL OR AN INORGANIC MATERIAL WITH A RUBBER AND METHOD THEREOF
Toshio Honda, Eishi Kubota, Yukio Fukuura, and Yoneji Kobayashi, Tokyo, Japan, assignors to Bridgestone Tire Company Limited, Tokyo, Japan
No Drawing. Filed Nov. 16, 1970, Ser. No. 90,158
Claims priority, application Japan, Nov. 19, 1969, 44/92,069; Feb. 28, 1970, 45/16,868
Int. Cl. C08d 9/10; C08g 5/10
U.S. Cl. 260—29.7 R                    6 Claims

ABSTRACT OF THE DISCLOSURE

An aqueous adhesive for adhering a polyester fibrous material or an inorganic material to a rubber consists of a mixture of a liquid adhesive base consisting mainly of a solution of a polyhydric phenol polysulfide dissolved in a resorcin excess resorcin-formaldehyde condensate and RFL solution consisting of a resorcin-formaldehyde resin and a rubber latex. The polyester fibrous material or inorganic material is adhered to the rubber by treating said material with the aqueous adhesive, drying the thus treated material at a high temperature and compressing the dried material to an unvulcanized rubber and then vulcanizing the rubber.

---

The present invention relates to an excellent novel adhesive for adhering a synthetic fiber, particularly a polyester fibrous material or an inorganic material to rubber.

An object of the present invention is to provide an adhesive developing a high adhesivity only by one step treatment and a liquid adhesive base, which is a starting material for preparing the adhesive.

A further object of the present invention is to provide an excellent adhesive for adhering an inorganic material to a rubber.

Another object of the present invention is to provide an adhesive having an excellent storage stability and no poison and inflammability, which is easy in handling and metering, high in shipping efficiency and suitable for mass-production of the product.

The term "polyester fibers" used herein means linear high molecular weight polyesters, which contain ester linkage in the main chain and the molecule of which is highly oriented in the direction of fiber axis.

Polyester fibers are obtained by condensing glycols, such as ethylene glycol, propylene glycol, methoxy-polyethylene glycol, pentaerythritol, etc., with dicarboxylic acids or dicarboxylates, such as terephthalic acid, isophthalic acid, dimethyl terephthalate, dimethyl isophthalate, etc., through esterification reaction or ester interchange reaction into a high degree of polymerization. The most typical fiber is polyethylene terephthalate fiber.

The fibrous materials mean reinforcing materials to be used for reinforcing rubber articles, such as air tire, belt, air spring, rubber hose and the like and they are used in form of filament, cord, cable, cord fabric, film, canvas and the like.

Furthermore an integration of inorganic materials and rubbers can provide useful products in industry and daily life. For example, tires for various cars, belt, hose, fender beam, buoy, window frame, means for preventing vibration, dumper and the like are produced in this manner. In this case, excellent adhesives for adhering inorganic materials and rubbers, which can endure and conditions in use, are needed.

Rubbers include all natural rubbers and synthetic rubbers, which are referred to as rubbery elastic polymers and mean a rubber selected from the group consisting of ordinarily used rubbers, such as natural rubber, styrene-butadiene copolymer rubber, polybutadiene rubber, polyisoprene rubber, isoprene-isobutylene copolymer rubber, polychloroprene rubber and the like or compositions of blends of two or more of these rubbers.

In reinforcement of a rubbery article with a fibrous material, a sufficient adhesion between the rubber and the fibrous material is required to endure a periodic large deformation subjected to rubber articles in the use.

Polyester fibers have high tensile strength and modulus and excellent heat resistance and waterproof and therefore they are one of the most preferable fibers for reinforcing rubber but they are difficult in adhesion to rubber.

In general, regenerated cellulose fiber, polyamide fiber, polyvinyl alcohol fiber and the like are used as fibers for reinforcing rubber articles but these fibers can be adhered to rubber sufficiently only by treating with a known liquid adhesive referred to as "RFL."

RFL is a liquid obtained by mixing an aqueous solution of primary polycondensate of resorcin with formaldehyde and a rubber latex and as the rubber latex use may be made of styrene-butadiene copolymer rubber latex and vinylpyridine-styrene-butadiene copolymer rubber latex. As the catalyst for reaction of resorcin and formaldehyde, use may be made of basic substances, such as sodium hydroxide, potassium hydroxide, ammonium hydroxide, and the like. The details have been described in M. I. Dietrik, Rubber World, 136, No. 6, p. 847 (1957), and D. Boguslavoki, Soviet Rubber Technology No. 1, p. 4 (1959) (published by The Research Association of British Rubber Manufacturers).

However, even if polyester fiber is treated with the above described RFL, a satisfactory result cannot be obtained.

Accordingly, a special consideration has been paid to adhesion of a polyester fiber to a rubber. For example, in British Pat. No. 816,640 polyester fiber is coated with a solution of polyisocyanate in an organic solution and then dried and further treated with RFL and dried. In Japanese patent application publication No. 10,514/64, polyester fiber is treated with a solution of an epoxy compound in an organic solvent and again with RFL.

However, in these methods the use of organic solvents has dangers of inflammability and poison and it is troublesome and inefficient to repeat the treatment and drying two times. In production of rubber articles, it is important to obtain a satisfactory adhesion by one step without effecting two step treatments in order to increase productivity.

Heretofore, in the case when an inorganic material, particularly a metal is adhered to a rubber, the surfaces of the metal are plated with brass and the plated metal is adhered to the rubber. However, in this process enormouse expense is needed for the material and apparatus in order to effect brass plating and the composition of brass alloy and rubber compound must be selected strictly and further when water in air is adsorbed, the adhesivity lowers.

Another method for adhering a metal to a rubber comproses coating chlorinated rubber, cyclized rubber, synthetic resin, isocyanates, etc., on surfaces of metal and then adhering a rubber on the thus coated metal. However, in the case when these substances are to be coated on surfaces of metal, they must be previously dissolved in an organic solvent and then coated. Therefore, in production of a small amount, there is no hindrance, but in mass-production, a danger due to poison and inflammability of the organic solvent increases.

Moreover, epoxy resin and isocyanate resin used in many cases among synthetic resins have limitation in the storage period and also in this point this process is not suitable for mass-production. A further cause for preventing the mass-production lies in necessity of two times coating for the adhesion. For example, when using chlorinated rubber, metal surfaces are firstly coated with a solution of chlorinated rubber having a high content of chlorine and dried and then again coated with a solution of chlorinated rubber having a low content of chlorine and dried, after which the thus treated metal is compressed into unvulcanized rubber and vulcanization is effected, whereby the metal and the rubber are integrated. Such two step coating requires two times of installation and time as compared with one step coating, so that such a process is considerably undesirable for mass-production.

The present invention relates to a safe and harmless adhesive having an excellent storage stability, which can adhere an inorganic material to a rubber strongly by one step coating.

The term "inorganic materials" used herein means metals, silicates and other ceramics, which have any forms useful in industry and daily life. For example, wire plate, rod, sphere, mass, foil, powder and all other forms of inorganic materials are included.

Metals are, for example, ones other than alkali metal single body, such as sodium, potassium, lithium and the like, and materials consisting mainly of iron, nickel cobalt, aluminum, chromium, manganese, niobium, tantalum, titanium etc., and alloys thereof, particularly, for example, stainless steel, duralumin.

As silicates and ceramics, mention may be made of glasses, enamels, cements and other cementitious materials such as various limes, dolomite plaster, various gypsums, magnesia cement, pozzolanic cements, natural cements, portland cement, mixed cement, alumina cement and the like and special ceramic materials, refractories, heat insulating materials, ceramic abrasives, etc., for example, various potteries, such as porcelain, sintered earthen ware, earthen ware, stone ware (brazier, tea-things, acid-proof stone ware bottle, stone ware pipe, paving bricks, wrapping tile, etc.), crockeries (roof tile, unglazed diaphragm for electrolysis, flowerpot, etc.), sinterkorund, cordierite porcelain, lithia porcelain, ferrite, cermet, ceramic, heat-resisting porcelain and the like.

Hitherto there have been few or no good adhesives for adhering a silicate or a ceramic to a rubber but it is surprising that according to the adhesive of the present invention these materials can be adhered to a rubber by one step coating or one step treatment.

Prior to the present invention, there has been no prior art by which a polyester fiber or an inorganic material is adhered favourably to a rubber by means of a polyhydric phenol polysulfide in one step treatment.

The inventors have made various investigations and found that polyhydric phenol polysulfides have a special function in adhesion of a polyester fiber or an inorganic material to a rubber and ascertained that a polyester fiber or an inorganic material is adhered to rubber strongly by an adhesive consisting mainly of a polyhydric phenol polysulfide in one step treatment.

The term "polyhydric phenols" used herein means phenols having at least two hydroxyl groups per one benzene ring, for example, hydroxyquinone, resorcin, orcinol, pyrogallol, phlorogulcinol, pyrocatechin and the like. Polysulfides of these polyhydric phenols are compounds having a relatively complicated configuration, which have sulfur atom chains between benzene rings of the phenol and the effective sulfides according to the present invention have two or more sulfur atoms in the sulfur chains and are shown by the following formula

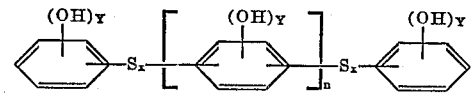

wherein $x$ represents an integer of 2 to 8 and $x$ in each $S_x$ is not always the same integer, $Y$ represents 2 to 3 and $n$ represents 0 or an integer of 1 to 15. In crude polyhydric phenol polysulfide obtained by synthesis, the above described $x$ and $n$ have some distributions and single compound is hardly obtained but according to the present invention, the crude polyhydric phenol polysulfides can be used.

These compounds can be produced by various methods and for example by reacting the above described polyhydric phenols with sulfur chloride in a solvent inert for sulfur chloride. The most preferable polyhydric phenol polysulfide is resorcin polysulfide, because resorcin is scarcely oxidized in air and is stable.

The polyhydric phenol polysulfides are obtained in various forms from a highly viscous semisolid state to a bulky powdery state depending upon the conditions in the synthesis reaction but any state is very difficult in handling.

As liquid adhesive base, it is desirable that metering, shipping and storage are easy and degradation is not caused for a long period of time.

Accordingly, it is considered to dissolve the polyhydric phenol polysulfide in an organic solvent but the use of organic solvent is very undesirable in view of inflammability and injury.

The polyhydric phenol polysulfides are poorly dissolved in an acidic and neutral water but is relatively readily dissolved in an alkaline water. However, in general, polyhydric phenols are considerably oxidized in air at an alkaline side and the degradation and coloration are significant, so that the dissolution in an alkaline water is not preferable.

The inventors have made many investigations for obtaining a liquid adhesive base by dissolving the polyhydric phenol polysulfides without affecting adversely the adhesion of a polyester fiber or an inorganic material to a rubber and found that the polyhydric phenol polysulfides are easily dissolved in resorcin-formaldehyde condensate containing an excess amount of resorcin.

The term "resorcin-formaldehyde condensate containing an excess amount of resorcin" (abridged as resorcin excess resorcin-formaldehyde condensate hereinafter) used hereinafter means one obtained by reacting resorcin with Formalin containing formaldehyde of less than equimole based on resorcin, which is a liquid showing fluidity if 30–40% Formalin is used at room temperature. The amount of formaldehyde is preferred to be 0.10 to 0.75 mole based on 1.0 mole of resorcin. Beyond this range the fluidity decreases and such an amount is not preferable. For the reaction an acidic and basic catalyst may be used but the reaction can be sufficiently completed only by heating without using any catalyst. Rather, it is preferable not to use any catalyst. For example, resorcin is melted by heating up to about 120° C. and formaldehyde is added dropwise thereto while maintaining this temperature. After the addition, the resulting mixture is stirred for about 30 minutes to complete the reaction.

The thus obtained resorcin excess resorcin-formaldehyde condensate is a yellow clear fluid. By dissolving a given amount of the polyhydric phenol polysulfides in such resorcin excess resorcin-formaldehyde condensate, the liquid adhesive base to be used in adhesion of a polyester fiber or an inorganic material to rubber can be obtained. In this case, the polyhydric phenol polysulfide may be dissolved directly in resorcin excess resorcin-formaldehyde condensate, while in order to avoid a troublesome operation for scraping out the polyhydric phenol polysulfide from the reaction vessel, the polyhydric phenol polysulfide is once dissolved in a suitable organic solvent, for example, methanol and the resulting solution is discharged from the reaction vessel and added to the above described resorcin excess resorcin-formaldehyde condensate and then methanol is completely removed under a reduced pressure to obtain a homogeneous organy yellow clear fluid liquid.

The amount of resorcin excess resorcin-formaldehyde condensate is preferred to be 200 to 1.0 parts by weight per 1.0 part by weight of the polyhydric phenol polysulfide (part means part by weight hereinafter). If the amount is too large, the adhesivity lowers, while if the amount is too small, the solubility decreases and the viscosity increases and the handling is difficult. In resorcin excess resorcin-formaldehyde condensate, water contained in Formalin and water due to the condensation reaction are incorporated in a small amount but the presence of such a small amount of water is warrantable to the object of the present invention. However, a too large amount of water decreases the solubility to the polyhydric phenol polysulfide and reduces the substantial concentration and is not preferable. The amount of water should be adjusted to less than 25% of the whole resorcin-formaldehyde condensate. The thus prepared liquid adhesive base of the present invention is fluid at room temperature and is kept under a weakly acidic condition in the presence of resorcin, so that the liquid adhesive base is very stable against oxidation owing to oxygen in air and can be storaged for a long period of time. Furthermore, inasmuch as low molecular weight volatile organic solvents are not contained, there is no inflammability and injury and since the substantial concentration is high, the shipping efficiency is high and since there is fluidity, the shipping and metering are easy.

Then an explanation will be made with respect to a process for applying the liquid adhesive base of the present invention to adhesion of a polyester fiber or an inorganic material to a rubber.

It is preferable to use the liquid adhesive base after diluted with water prior to treatment of the fibrous materials or inorganic materials. However, as mentioned above, the liquid adhesive base contains a component, which is not completely dissolved in a neutral water, and therefore pH in water is increased by adding an appropriate amount of basic substance to water, whereby the liquid adhesive base is completely dissolved. As the basic substances, use may be made of hydroxides of alkali metals, such as sodium hydroxide, potassium hydroxide and the like; ammonium hydroxide; organic amines, such as monomethyl amine, monoethyl amine, monopropyl amine, etc. pH of the diluting water must be more than 9.0. The most preferable basic material is ammonium hydroxide.

The liquid adhesive of the present invention is formed by mixing the diluted above mentioned liquid adhesive base with RFL.

With the thus obtained liquid adhesive, polyester fibrous materials or inorganic materials are treated and dried. The thus treated materials are compressed to an unvulcanized rubber containing a vulcanizing agent and the vulcanization is effected, thereby a polyester fibrous material or an inorganic material is adhered to a rubber very strongly. The processes for treating the fibrous materials or inorganic materials with the liquid adhesive may be carried out by various means. For example, the materials are immersed in the liquid adhesive and taken up and then the excess amount of liquid adhesive is squeezed out, or the liquid adhesive is coated or sprayed on the materials.

The temperature of drying and heat treatment is an important factor in the use of the liquid adhesive of the present invention. When polyester fibrous materials are to be adhered, said temperature is not lower than 200° C., preferably not lower than 220° C. and not higher than 250° C., because the component of the adhesive of the present invention diffuses in polyester only at a temperature of not lower than 200° C. and at a temperature of lower than 200° C. a favourable adhesivity cannot be attained. Hence, the higher the drying temperature, the better the result is, but a temperature higher than 251° C., polyester fibers are softened and deteriorated and decrease the strength, consequently, the treatment is impossible or undesirable results are obtained. As a preliminary step before the drying and heat treatment at a high temperature, a drying treatment at a temperature of lower than 200° C. may be effected.

The amount of solid component of the adhesive applied on the materials to be adhered is adjusted to 0.5 to 10 parts by weight per 100 parts by weight of the materials. When the amount is too small, the adhesivity is low, while when the amount is too large, the adhesivity does not increase in proportion to the increase of the adhesive.

When the inorganic materials are to be adhered, the temperature of the drying and heat treatment is 180 to 300° C. In the case of lower than 180° C., the heat treatment time is prolonged and this is undesirable in view of economy, while in the case of higher than 300° C., the adhesive is apt to be oxidized and deteriorated by oxygen in air.

When the inorganic materials are treated, it is preferable to deposit the solid component of the adhesive on the surfaces of the inorganic materials thin and uniformly as far as possible. The thickness of the solid component layer of adhesive formed on the inorganic materials provides a satisfactory adhesivity in less than 0.5 mm. It is not necessary to make the surfaces of inorganic materials rough by a sand blast and the like. For example, it is possible to adhere a rubber strongly to a very smooth surface such as a transparent window glass.

The mixture ratio of each solid component of the liquid adhesive base and RFL is preferred to be 0.5 to 10.0 parts by weight of RFL per 1.0 part by weight of the liquid adhesive base and in both cases when said ratio is too small and too large, the adhesivity decreases. Particularly when said ratio is too small, latex is liable to be solidified and such an amount is not preferable. The particularly preferable amount is 0.8 to 3.0 parts.

A further explanation will be made with respect to RFL. The mole ratio of reaction of resorcin and formaldehyde is 1.0:1.0 to 1.0:7.0, preferably 1.0:1.4 to 1.0:3.0. The ratio of solid content of rubber latex to resorcin-formaldehyde resin is 100:1 to 100:35, preferably 100:10 to 100:25. As the catalyst for condensation of resorcin and formaldehyde, use may be made of basic substances, such as hydroxides of alkali metals, for example sodium hydroxide, potassium hydroxide, etc., ammonium hydroxide, methyl amine, piperazine, urea, thiourea, etc. The amount is adjusted so that pH of RFL is 7.5 to 12.0, preferably 8.5 to 11.0. Furthermore, the above condensation is promoted by the action of potassium hydroxide, sodium hydroxide, ammonium hydroxide, etc., which have been added as a stabilizer for the latex, even if such catalyst is not particularly added. The total solid content of the adhesive of the present invention, which is composed of the above described liquid adhesive base and RFL is preferred to be adjusted between 1% and 25%, more preferably 10 to 20%. If the concentration is too high, the latex in RFL is liable to be solidified and such a concentration is not preferable.

As rubber latex, use may be made of natural rubber latex and synthetic rubber latex, such as styrene-butadiene copolymer rubber latex, styrene-vinyl pyridine-butadiene copolymer rubber latex and the like. When rubbers to be adhered are ordinarily used rubbers, such as natural rubber, styrene-butadiene copolymer rubber, polybutadiene rubber, polyisoprene rubber, etc., at least one of any above described rubber latexes may be used. In general, the kind of rubber latex is determined depending upon the kind of rubber to be adhered. For example, when acrylonitrile-butadiene copolymer rubber latex is to be adhered, the use of said rubber latex is acceptable.

As mentioned above, polyhydric phenol polysulfides have never been used for adhesion of a polyester fibrous material to a rubber. Furthermore, as mentioned above, a process using the polyhydric phenol polysulfides, by which said material can be adhered to rubber only by immersing in the liquid adhesive and then drying said liquid, namely one step adhering process has never been accomplished. The reason why the polyhydric phenol polysulfides have a more excellent effect for adhesion of polyester fibrous material than resorcin is based on the fact that polyhydric phenol polysulfides have a higher affinity to polyesters than resorcin and consequently said polysulfides diffuse rapidly into polyester fiber in the heat treatment at a high temperature and have a good compatibility to resorcin-formaldehyde resin.

The adhesive of the present invention has adhesivity to fibers other than polyester fibers, which are more easily adhered than polyester fiber, for example, polyamide fiber, polyvinyl alcohol fiber, regenerated fiber and the like but in this case the adhesivity is the same as that of RFL and has no particularly good results as compared with RFL. Presumably, this is because the remarkable effect for polyester fiber is due to the above described reason.

It will be contemplated to use polysulfides of phenol or alkylphenols, such as phenol, cresol, xylenol, p-tert. butylphenol, but they have no effect. Presumably this is because these polysulfides are lower in reactivity to resorcin-formaldehyde resin than polyhydric phenol polysulfides but the reason is not yet clear.

Moreover, the demerit of the polysulfides of phenol or alkylphenols, is that these polysulfides have no or very poor solubility to an alkaline water and they are not suitable for the object of the present invention.

The following examples are given in illustration of this invention and are not intended as limitations thereof. The percentage and part used herein mean by weight.

EXAMPLE 1

In a flask 55 parts of resorcin was dissolved in 500 parts of ethyl ether and 34 parts of sulfur monochloride was added dropwise thereto gradually over 3 hours at 25° C. while stirring. The generated gaseous hydrochloric acid was passed slowly to a gas washing bottle containing a diluted ammonia water by an aspirator to evolve white smoke of ammonium chloride. Until the white smoke of ammonium chloride was not observed, about 24 hours were needed. Then ethyl ether was distilled off under a reduced pressure to obtain viscous semisolid-semiliquid resinous resorcin polysulfide, which was very difficult in handling. Methyl alcohol was added thereto to obtain 20% methyl alcohol solution.

160 parts of resorcin was melted in a flask equipped with a reflux condenser by heating at 120° C. and 45 parts of 37% of Formalin was added dropwise thereon over 20 minutes while stirring and then the reaction was continued for further 40 minutes to obtain resorcin excess resorcin-formaldehyde condensate. 100 parts of resorcin excess resorcin-formaldehyde condensate was added to 100 parts of the above described methyl alcohol solution and from the resulting mixture methyl alcohol was completely removed under a reduced pressure to obtain orangy yellow clear homogeneous liquid adhesive base. This liquid adhesive base contained 11.0% of water. This liquid was a fluid having a viscosity of about 460 poises at 25° C., which was easy in the handling, and did not show any variation after left to stand in air for more than 6 months.

Then, 15% of RFL having the following composition was prepared and aged for 48 hours.

| | Parts |
|---|---|
| Resorcin | 11.0 |
| 37% Formalin | 16.2 |
| 28% ammonium hydroxide | 10.0 |
| Gentac latex* | 244.0 |
| Water | 519.0 |

*Made by U.S.A. General Tire and Rubber Co. vinyl pyridine-styrene-butadiene copolymer rubber latex, concentration 41%.

100 parts of the liquid adhesive base prepared as described above was added to a solution obtained by diluting 40 parts of 28% of ammonium hydroxide in 526 parts of water and this liquid adhesive base was immediately dissolved in the aqueous ammonium hydroxide solution to form a homogeneous liquid. 100 parts of the thus resulting liquid was mixed with 100 parts of the above described RFL to prepare a liquid adhesive.

Polyethylene terephthalate tire cord having a twist structure of 1,100 D/3, a ply twist of 43 turns/10 cm. and a cable twist of 43 turns/10 cm. was immersed in the above described liquid adhesive and then dried and heat-treated in air kept at 235° C. for 2 minutes. 6.5 parts based on 100 parts of fiber, of the adhesive component deposited on the thus treated cord.

The treated cord was embedded near the surface of unvulcanized compounded rubber composition sheet and vulcanization was effected at 150° C. for 20 minutes under a pressure of 80 kg./cm.$^2$. The cord was dug out from the vulcanized rubber and peeled at a rate of 30 cm./min. and the resistance to peeling force was determined. This resistance to peeling force is referred to as "adhesivity" hereinafter. The adhesivity in the above described cord was 2.8 kg.

The compounded rubber to be used for the adhesion had the following composition.

| | Parts |
|---|---|
| Natural rubber | 80 |
| Styrene-butadiene copolymer rubber | 20 |
| Carbon black | 40 |
| Stearic acid | 2 |
| Petroleum series softener | 10 |
| Pine tar | 4 |
| Zinc white | 5 |
| N-phenyl-$\beta$-naphthyl amine | 1.5 |
| 2-benzothiazolyl disulfide | 0.75 |
| Diphenyl guanidine | 0.75 |
| Sulfur | 2.5 |

COMPARATIVE EXAMPLE 1

The liquid adhesive base in Example 1 not adding resorcin polysulfide was diluted with ammonia water in the same manner as described in Example 1 to prepare 15% resorcin excess resorcin-formaldehyde condensate solution. By using this solution the test was made in the same manner as described in Example 1 and the adhesivity was 1.3 kg. From this fact, it can be seen apparently that the effect of resorcin polysulfide was high.

COMPARATIVE EXAMPLE 2

Phenol polysulfide was prepared instead of resorcin polysulfide in Example 1 in the same manner as described in Example 1 except that toluene was used as a solvent and the reaction temperature was 75° C. By using phenol polysulfide a liquid adhesive was prepared in the same manner as described in Example 1 and the test was made. The adhesivity was only 1.0 kg. Furthermore, in the liquid adhesive base there were portions insoluble in ammonia water.

EXAMPLE 2

Instead of RFL used in Example 1, RFL prepared without using ammonium hydroxide and aged, was used and a test was made in the same manner as described in Example 1. The adhesivity was 2.6 kg.

EXAMPLE 3

In the composition of RFL used in Example 1, 10.0 parts of 10% aqueous solution of sodium hydroxide was used instead of ammonium hydroxide. By using the thus prepared RFL, a test was made and the adhesivity was 2.5 kg.

EXAMPLE 4

The adhesivity, when the mixture ratio by weight of the liquid adhesive base to RFL was varied as shown in the following table in Example 1, is shown in the following table.

| Liquid adhesive base: RFL | Adhesivity (kg.) |
|---|---|
| 80:100 | 2.9 |
| 60:100 | 2.7 |
| 40:100 | 2.4 |
| 20:100 | 2.2 |

EXAMPLE 5

The adhesivity, when the mixture ratio by weight of resorcin polysulfide to resorcin excess resorcin-formaldehyde condensate was varied as shown in the following table in Example 1, is shown in the following table.

| Resorcin excess resorcin-formaldehyde condensate: 20% slution of resorcin polysulfide in methanol | Adhesivity (kg.) |
|---|---|
| 100:75 | 2.5 |
| 100:150 | 2.8 |
| 100:200 | 2.8 |
| 100:250 | 2.7 |

EXAMPLE 6

The adhesivity of the liquid adhesive used in Example 1 between a metal and a ruber was measured by JISK-6301-8,2 process. This process is a test for peeling a sample in which a rubber piece is adhered between two parallel metal pieces. In this sample, a rubber cylinder having a thickness of 3.2±0.2 mm. and a diameter of 40.56 mm. was adhered to two metal plates having a diameter of 40.56±0.03 mm. and a thickness of more than 9.53 mm. on both upper and lower circular surfaces, respectively. The surfaces of the metal plates to be adhered to the rubber piece were finished very smoothly. The thus treated metal surfaces were coated with the above described liquid adhesive uniformly by a brush and the superfluous liquid adhesive was dipped off. The coated metal plates were dried in a drier kept at a constant temperature of 245° C. by circulating hot air for 5 minutes. A rubber cylinder composed of the following unvulcanized compounded rubber was compressed between the above described two metal plates and vulcanized at 155° C. for 40 minutes by using a give mould to prepare the above described sample.

Composition of compounded rubber

| | Parts |
|---|---|
| Natural rubber | 80 |
| Styrene-butadiene copolymer rubber | 20 |
| Carbon black | 40 |
| Stearic acid | 2 |
| Petroleum softener | 10 |
| Pine tar | 4 |
| Zinc white | 5 |
| N-phenyl-β-naphthylamine | 1.5 |
| 2-benzothiazolyl disulfide | 0.75 |
| Diphenyl guanidine | 0.75 |
| Sulfur | 2.5 |

Result of test

| Metal: | Adhesivity, kg./cm.$^2$ |
|---|---|
| Iron | 83 |
| Aluminum | 85 |
| Aluminum plated iron | 80 |
| Stainless steel | 80 |
| Duralumin | 78 |

All breakages occured in ruber portion and this means that the adhesivity is very strong.

EXAMPLE 7

A test piece having a width of 25 mm., a length of 150 mm. and a thickness of 3 mm. was prepared from a clear window glass plate and the very smooth surfaces of this glass plate were washed with acetone and then dried. The thus treated test piece was immersed in the liquid adhesive prepared in Example 1 and taken out and then left to suspend so that the superfluous liquid adhesive was fallen in drops and removed to form the test piece coated with a very thin liquid adhesive film. The resulting test piece was dried in a drier kept at a constant temperature of 245° C. by circulating hot air for 5 minutes. This test piece was compressed to unvulcanized rubber as described in Example 6 to effect vulcanization at 155° C. for 30 minutes. In this case said treatment was effected so as to form the thickness of rubber portion of 3 mm. The rubber and the glass plate were adhered very strongly and it was impossible to peel them by hand. Since the glass plate was broken by a conventional process, the test was impossible.

EXAMPLE 8

100 parts of normal portland cement, 300 parts of sand and 50 parts of water were mixed and the mixture was dried and cured at a relative humidity of 50% for 20 days and a test piece having a width of 25 mm., a length of 150 mm. and a thickness of 15 mm. was manufactured. This test piece was adhered to a rubber by treating the test piece in the same manner as described in Example 7. The test piece and the rubber were adhered strongly and it was impossible to peel the test piece from the rubber by hand. The force necessary for the peeling was 95 kg./2 mm. and the breakage was cohesive failure of rubber.

EXAMPLE 9

A porous tile having a thickness of 9 mm. for an experiment in chemistry (made by Nihon Kagaku Kogyo K.K., III type) was treated in the same manner as described in Example 7. The resistance for peeling force was 87 kg./25 mm. and the breakage was cohesive failure of rubber. Of course, it was impossible to peel the sample by hand.

EXAMPLE 10

A pottery tile was subjected to the same adhering operation as in Example 7 and the resistance for peeling force was 81 kg./25 mm. Of course, it was impossible to peel the sample by hand. The breakage was cohesive failure of rubber.

EXAMPLE 11

A steel tire cord for steel tire, which has not been plated with brass, was subjected to the same adhering treatment as described in Example 6 and adhered to the same compounded rubber as described in Example 6. The resulting sample was tested by a pull out adhesion test defined by ASTM specification D2229 with respect to the adhesivity and the average value of 12 cords was 120 kg./cord. The adhesivity of steel tire cord having the same structure as the above tire cord, which has been plated with brass composed of 70 parts of copper and 30 parts of zinc was 90 kg./wire. From this fact it can be seen that the adhesive of the present invention is more excellent than brass plating. The structure of steel cord was (1 x 3+5 x 7)+1, the diameter of the cord was 1.20 mm. and the diameter of steel filament was 0.15 mm.

What is claimed is:

1. An aqueous adhesive for adhering a polyester fibrous material or an inorganic material to a rubber in which water having a pH of at least 9.0 is used as a medium consisting of
a mixture of a liquid adhesive base (I) and an aqueous solution of resorcin-formaldehyde-latex (II), the total solids concentration of said aqueous adhesive being 1 to 25% by weight and
the weight ratio of the solids content of said liquid adhesive base (I) to said solution of resorcin-formaldehyde-latex being 1.0:0.5 to 1.0:10.0 wherein said liquid adhesive base consists essentially of a solution of a polyhydric phenol polysulfide having the general formula

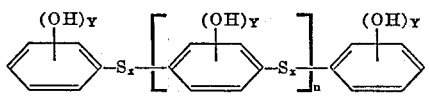

wherein $x$ represents an integer of 2 to 8 and $x$ in each $S_x$ is not always the same integer, Y is an integer of 2 to 3 and $n$ is 0 or an integer from 1 to 15, obtained by the reaction of sulfur chloride and a polyhydric phenol of the formula

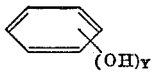

wherein Y has the same meaning as above in a solvent inert for sulfur chloride,
dissolved in a resorcin excess resorcin-formaldehyde condensate obtained by reacting resorcin with formaldehyde
in a mole ratio of 1.0:0.10 to 1.0:0.75,
the weight ratio of said polyhydric phenol polysulfide to said resorcin excess resorcin-formaldehyde condensate being 0.5:100 to 100:100;
and where said aqueous solution of resorcin-formaldehyde-latex contains a resorcin-formaldehyde resin obtained by reacting resorcin and formaldehyde in a mole ratio of 1.0:1.0 to 1.0:7.0 and
a rubber latex, the weight ratio of the solids content of the resorcin-formaldehyde resin to rubber latex being 1:100 to 35:100.

2. An adhesive as claimed in claim 1, wherein said polyhydric phenol polysulfide is resorcin polysulfide.

3. An adhesive as claimed in claim 1, wherein said polyhydric phenol polysulfide is hydroquinone polysulfide.

4. An adhesive as claimed in claim 1, wherein the weight ratio of the solid content of the liquid adhesive base to resorcin-formaldehyde-latex being 0.8 to 3.0.

5. An adhesive as claimed in claim 1, wherein the weight ratio of the solid content of the resorcin-formaldehyde resin to the rubber latex is 10:100 to 25:100.

6. An adhesive as claimed in claim 1, wherein the concentration of the solid content of the mixture is 10 to 20% by weight.

References Cited
UNITED STATES PATENTS

| | | | |
|---|---|---|---|
| 2,652,353 | 9/1953 | Wilson | 154—136 |
| 2,711,383 | 6/1955 | Ruggeri et al. | 154—130 |
| 3,455,851 | 7/1969 | Meredith et al. | 260—3 |

OTHER REFERENCES

Skeist, Handbook of Adhesives, p. 289 (Reinhold, 1962), TP968S5C.4.

MORRIS LIEBMAN, Primary Examiner

T. DE BENEDICTIS SR., Assistant Examiner

U.S. Cl. X.R.

156—110 A, 335; 260—3, 29.3, 48, 844, 845